United States Patent
Bielas

(10) Patent No.: US 9,244,155 B2
(45) Date of Patent: Jan. 26, 2016

(54) ADAPTIVE ELECTRONICALLY STEERABLE ARRAY (AESA) SYSTEM FOR MULTI-BAND AND MULTI-APERTURE OPERATION AND METHOD FOR MAINTAINING DATA LINKS WITH ONE OR MORE STATIONS IN DIFFERENT FREQUENCY BANDS

(75) Inventor: Michael S. Bielas, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 762 days.

(21) Appl. No.: 13/357,933

(22) Filed: Jan. 25, 2012

(65) Prior Publication Data

US 2012/0200449 A1    Aug. 9, 2012

Related U.S. Application Data

(60) Provisional application No. 61/441,138, filed on Feb. 9, 2011.

(51) Int. Cl.

| | |
|---|---|
| *G01S 7/00* | (2006.01) |
| *H01Q 21/00* | (2006.01) |
| *H01Q 21/30* | (2006.01) |
| *F41G 7/30* | (2006.01) |
| *H01Q 1/28* | (2006.01) |
| *H01Q 3/26* | (2006.01) |
| *G01S 13/02* | (2006.01) |

(52) U.S. Cl.
CPC ............... *G01S 7/006* (2013.01); *F41G 7/306* (2013.01); *H01Q 1/281* (2013.01); *H01Q 3/2605* (2013.01); *H01Q 21/0025* (2013.01); *H01Q 21/0056* (2013.01); *G01S 2013/0254* (2013.01); *G01S 2013/0272* (2013.01); *H01Q 21/30* (2013.01)

(58) Field of Classification Search
USPC ................................ 342/62, 372, 374; 701/3
IPC ....... G01S 7/006,13/88, 2013/0254, 2013/0272; H01Q 1/286, 3/2605, 5/001, 21/0025, 21/30; F41G 7/306
See application file for complete search history.

(56) References Cited

U.S. PATENT DOCUMENTS

| | | | | |
|---|---|---|---|---|
| 3,202,992 | A | * | 8/1965 | Kent et al. ................... 342/372 |
| 4,912,481 | A | * | 3/1990 | Mace et al. ............ 343/700 MS |
| 5,434,580 | A | * | 7/1995 | Raguenet et al. ...... 343/700 MS |
| 5,485,167 | A | * | 1/1996 | Wong et al. .................. 343/753 |
| 5,831,581 | A | * | 11/1998 | Keough ........................ 343/725 |

(Continued)

FOREIGN PATENT DOCUMENTS

| | | | |
|---|---|---|---|
| CA | 2009965 C | * | 8/1995 |
| WO | WO-2012/109016 A2 | | 8/2012 |

OTHER PUBLICATIONS

IEEE Standard Letter Designations for Radar-Frequency Bands, IEEE Std 521-1984, 1984.*
"International Application Serial No. PCT/US2012/022509, International Preliminary Report on Patentability mailed Mar. 13, 2014", 7 pgs.
"Lieutenant General Patrick J. O'Reilly's Statement before the House Armed Services Committee", [online]. http://www.mda.mil/global/documents/pdf/ps_hasc100109.pdf, (Oct. 1 , 2009), 2-10.

(Continued)

*Primary Examiner* — Gregory C Issing
*Assistant Examiner* — Fred H Mull
(74) *Attorney, Agent, or Firm* — Schwegman Lundberg & Woessner, P.A.

(57) ABSTRACT

Embodiments of an adaptive electronically steerable array (AESA) system suitable for use on a vehicle and method for communicating are generally described herein. In some embodiments, the AESA system includes a plurality of arrays of radiating elements and control circuitry to configure the arrays for multi-band and multi-aperture operations to maintain data links with communication stations.

13 Claims, 5 Drawing Sheets

(56) References Cited

U.S. PATENT DOCUMENTS

| | | | |
|---|---|---|---|
| 6,008,760 A * | 12/1999 | Shattil | 342/378 |
| 6,208,293 B1 * | 3/2001 | Adams et al. | 342/368 |
| 6,349,218 B1 * | 2/2002 | Nakagawa et al. | 455/562.1 |
| 6,571,097 B1 * | 5/2003 | Takai | 455/436 |
| 2005/0068228 A1 * | 3/2005 | Burchfiel | 342/357.06 |
| 2005/0240341 A1 | 10/2005 | Fielhauer et al. | |
| 2008/0122683 A1 | 5/2008 | Howley et al. | |
| 2009/0092158 A1 * | 4/2009 | Izadpanah et al. | 372/18 |
| 2009/0289863 A1 * | 11/2009 | Lier | 343/753 |
| 2009/0323047 A1 | 12/2009 | Karazi et al. | |
| 2010/0117913 A1 * | 5/2010 | Jung | 343/724 |
| 2010/0292871 A1 | 11/2010 | Schultz et al. | |
| 2010/0328188 A1 | 12/2010 | Chang et al. | |
| 2012/0106299 A1 * | 5/2012 | Rowe et al. | 367/138 |

OTHER PUBLICATIONS

Brookner, E., et al., "Phased-Array Radars: Past, Astounding Breakthroughs and Future Trends", *Microwave Journal*, 51(1), (2008), 30-50.

Hommel, Hans, et al., "Current Status of Airborne Active Phased Array (AESA) Radar Systems and Future Trends", Microwave Symposium Digest, This paper appears in: Microwave Symposium Digest, 2005 IEEE MTT-S International Issue Date: Jun. 12-17, 2005 ; ISSN: 01490-645X; Print ISBN: 0-7803-8845-3, (2005), 1449-52.

"International Application Serial No. PCT/US2012/022509, International Search Report mailed Apr. 9, 2012", 2 pgs.

"International Application Serial No. PCT/US2012/022509, Written Opinion mailed Apr. 9, 2012", 5 pgs.

* cited by examiner

ADAPTIVE ELECTRONICALLY STEERABLE ARRAY (AESA) SYSTEM FOR MULTI-BAND AND MULTI-APERTURE OPERATION AND METHOD FOR MAINTAINING DATA LINKS WITH ONE OR MORE STATIONS IN DIFFERENT FREQUENCY BANDS

PRIORITY CLAIM

This application claims priority under 35 U.S.C. 119 to U.S. Provisional Patent Application Ser. No. 61/441,138, filed Feb. 9, 2011, (reference number 10-1088P).

GOVERNMENT RIGHTS

This invention was not made with United States Government support. The United States Government does not have certain rights in this invention.

TECHNICAL FIELD

Embodiments pertain to adaptive electronically steerable arrays (AESAs). Some embodiments relate to AESA-based data links for interceptors, including next generation interceptor (NGIs).

BACKGROUND

One issue with conventional interceptors is maintaining a data link with control stations, particularly when more than one frequency band is used. The use of separate fixed radiation pattern antennas, transceivers and modems for each frequency band increases the cost, weight and complexity.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
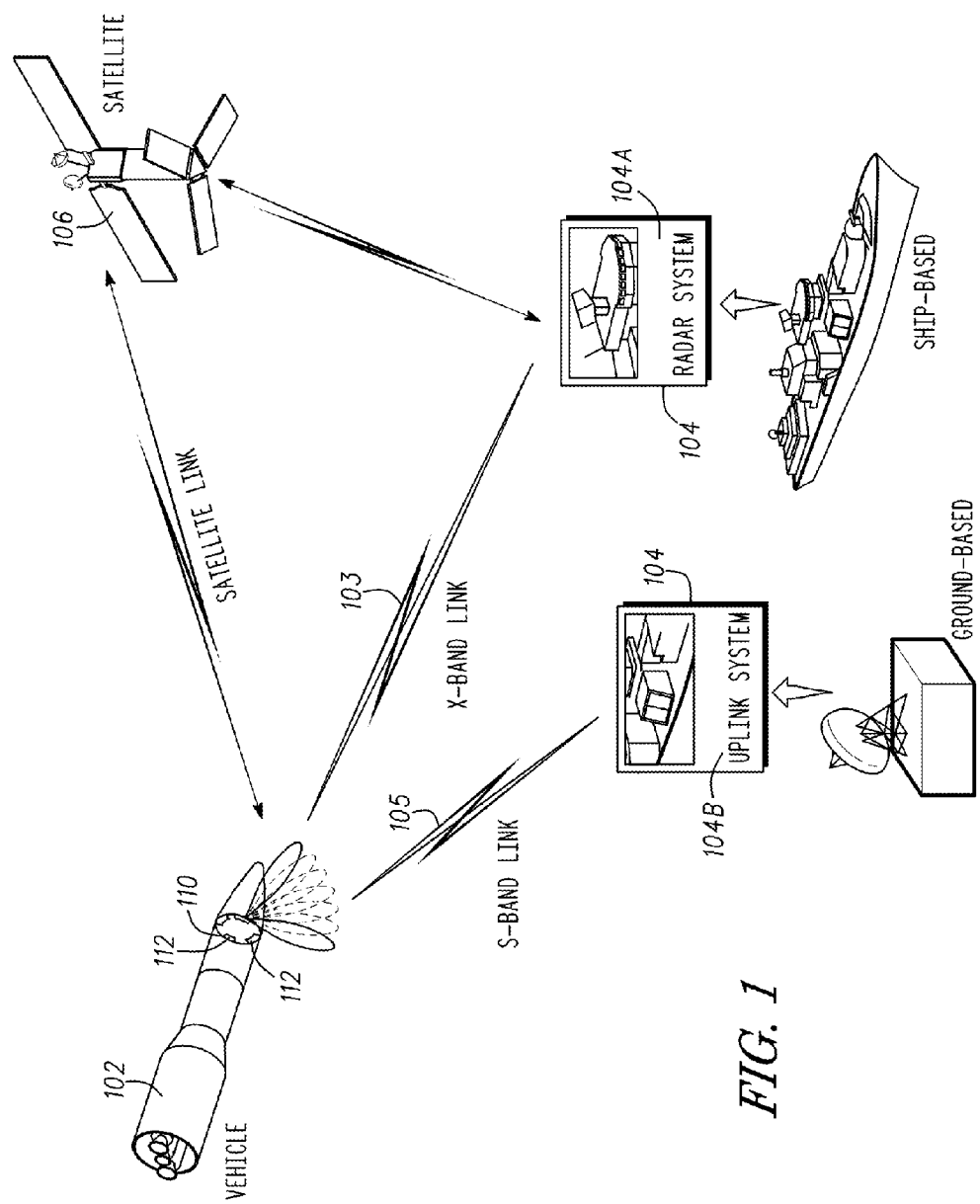
FIG. 1 illustrates a system environment in accordance with some embodiments.

FIG. 1 illustrates a system environment in accordance with some embodiments. A vehicle 102 may include one or more suitable adaptive electronically steerable arrays (AESAs) 112. Each array 112 may include a plurality of radiating elements and control circuitry 110 to configure the elements for multi-band and multi-aperture operations. These embodiments may illustrate an AESA-based data link communication system for kill vehicles enabling enhanced concept of operations (CONOPS) with radars operating in various frequency bands.

The control circuitry 110 may be configured to use a line-of-sight (LOS) vector to direct the array 112 for communications with a communication station 104 as the vehicle 102 maneuvers. The vehicle 102 may be an interceptor such as a kill-vehicle or missile, although the scope of the embodiments is not limited in this respect. The vehicle 102 may include aircraft including drones and unmanned aerial vehicles (UAVs). The communication stations 104 may be ground based, ship-based, aircraft-based or satellite-based communication stations. In these embodiments, the control circuitry 110 may be configured to steer the array 112 to maintain communications with one or more communication stations 104 during the flight path of the vehicle 102. The ground and ship based communication stations may be ground or ship based radars configured for tracking targets as well as communicating with vehicles such as interceptors. A satellite-based communication station 106, for example, may act as a relay station for communications with a ground, ship or aircraft-based communication station. Accordingly, communication links with the communication stations 104 may be maintained as the vehicle 102 maneuvers.

Advantages to the embodiments disclosed herein, which will become more apparent, based on the description below, include low probability of intercept, high anti-jam resistance, high data rates and long ranges.

In some embodiments, the control circuitry 110 may be configured to use the LOS vector to reconfigure the array 112 to switch between communicating with a first communication station 104A and a second communication station 104B. In the example illustrated in FIG. 1, an X-band link 103 may be established for communicating with a first communication station 104A, and an S-band link 105 may be established for communicating with a second communication station 104B. In these example embodiments, the second communication station 104B may be over-the-horizon with respect to the first communication station 104A and the control circuitry may be configured to cause the array 112 to switch between communicating with the first communication station 104A and the second communication station 104B at some point during the flight path of the interceptor 102. In these embodiments, the use of a LOS vector allows the control circuitry 110 to direct communications (i.e., direct one or more antenna beams) toward one or more of the communication stations 104. Accordingly, a communication link with at least one communication station 104 may be maintained during the flight path as the vehicle 102 maneuvers. The switching and handing-off of communications between communication stations 104 in this manner may provide for a significant range extension for interceptors. In some embodiments, the switching from S-band to X-band may occur after launch.

In some embodiments, one communication station 104 (e.g., communication station 104A) may be an Army Navy/Transportable Radar Surveillance (AN/TPY-2) uplink system (radar and communication), and another communication station 104 (e.g., communication station 104B) may be a Joint Electronic Designation System Radar designated as AN/SPY-2 (AN/SPY-2) radar system, although the scope of the embodiments is not limited in this respect. Other types of communication stations are also suitable.

Figure 2A:
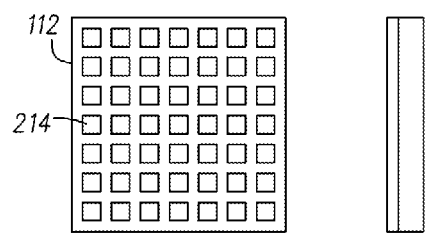
FIGS. 2A and 2B illustrate an adaptive electronically steerable array (AESA) in accordance with some embodiments.
Figure 2B:
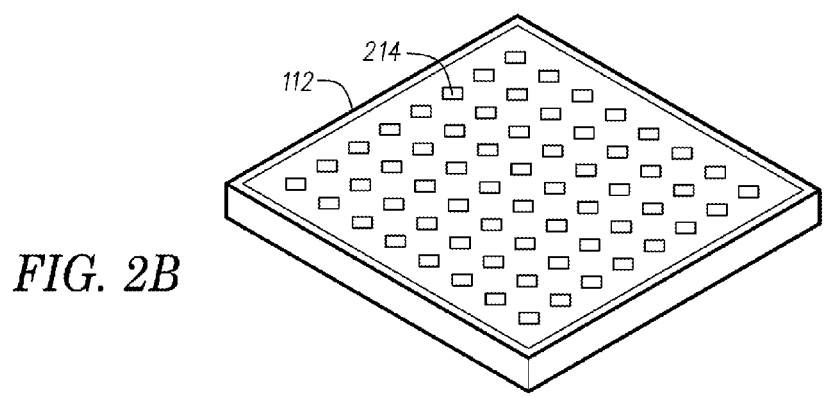

FIGS. 2A and 2B illustrate an adaptive electronically steerable array (AESA) in accordance with some embodiments.

As illustrated in FIGS. 2A and 2B, the array 112 comprises a plurality of radiating elements 214. FIG. 2A illustrates a top and a side view of an AESA 112 and FIG. 2B illustrates a perspective view of an AESA 112.

In some embodiments, each of the elements may comprise a patch antenna, while in other embodiments, dipole antennas, such as L-Band dipoles may be used, although the scope of the embodiments is not limited in this respect. In some embodiments, the array 112 may comprise a plurality of tile-modules where each element may be associated with a single tile. These embodiments allow the array to be curved to match the curvature of the interceptor. In some embodiments, radiating elements 214 may comprise may comprise directional or omnidirectional antennas, including, for example, dipole antennas, monopole antennas, patch antennas, loop antennas, microstrip antennas or other types of antennas suitable for transmission of RF signals.

In some embodiments, higher power amplifier devices may be utilized for transmitting. In these embodiments, a reduced duty-cycle of between 5 to 10 percent, for example, may be utilized when communicating with radar stations rather than a more conventional fifty-percent transmit/receive duty cycle. In this way, the excess heat generated by the higher power amplifier devices may be less of a concern. Lower duty cycles are a characteristic of operating with radars as communications links since radar loading (for example tracking and surveillance) prohibits much time to be dedicated to communications; hence the lower duty cycle.

In some embodiments, the control circuitry 110 may be further configured to switch between communicating within a first frequency band through a first aperture to communicating within a second frequency band through a second aperture. The first and second frequency bands may be widely-spaced frequency bands having at least a five percent carrier frequency separation, although this is not a requirement. In these embodiments, widely-spaced frequency bands may refer to frequency bands that are outside of the radio's instantaneous bandwidth (e.g., on the order of 10 MHz to 20 MHz) or outside of the antenna's resonate frequency (e.g., typically about 5% of the carrier frequency). Widely-spaced frequency bands may also refer to different bands as defined by the FCC or ITU such as VHF, UHF, L, S, Ku, K, Ka, etc.

In some embodiments, the first frequency band is a higher-frequency band than the second frequency band. For multi-band and the multi-aperture operations, the control circuitry 110 (FIG. 1) may configure each element 214 as a single aperture for communicating within the first frequency band and may configure a plurality of two or more elements 214 to operate as a single aperture for communicating within the second frequency band. In these embodiments, when two or more elements 214 operate as a single aperture for communicating within the second frequency band, the control circuitry 110 may be configured to coherently combine signals for the two or more elements for single-aperture operation. In these embodiments, the two or more elements 214 that operate as a single aperture are treated as a single element from the perspective of beam directing and steering (e.g., each element would have the same phase shift). This is unlike a conventional shared-aperture in which a single aperture is used for communicating with two or more communication stations.

In some embodiments, the control circuitry 110 configures a perfect-square number of elements 214 to operate as a single aperture for communicating within the second frequency band although the scope of the embodiments is not limited in this respect. In some embodiments, groups of four, nine or sixteen elements of the array 112 arranged in a square may be configured to operate as a single aperture for communicating within one or more secondary frequency bands. In some embodiments, the number of elements 214 used may be selectable to change the antenna pattern as well as the size and shape of the array for different transmit and receive capabilities.

In some embodiments, the first frequency band is X-band and the second frequency band is S-band. For communicating at an X-band frequency, each element 214 may be configured to operate as a single aperture. For communicating at an S-band frequency, squares of four elements 214, for example, may be configured to operate as a single aperture. In an example embodiment in which the array 110 includes sixty-four elements 214, X-band operations may utilize sixty-four different apertures, while S-band operations may utilize sixteen different apertures (e.g., 4×4 element squares). Although S-band operates with fewer effective elements than X-band possibly resulting in a lower-antenna gain, S-band enjoys a path-loss advantage (because path loss scales as $20 \log_{10}$ of the frequency) over X-band diminishing many performance tradeoffs between the bands.

Although some of the embodiments disclosed herein utilize a perfect-square number of antenna elements either for an array or for a single aperture, the scope of the embodiments is not limited in this respect as other array sizes and aperture configurations are also suitable. For example, an 8×12 element X-band array may operate as a 2×3 aperture S-band array. These embodiments may be configured to provide additional gain in certain directions. In one example embodiment, a 128×8 element array may be used.

In accordance with some multi-frequency band embodiments that utilize three or more frequency bands, the array 112 may be configured for communications within additional frequency bands by configuring additional numbers of elements 214 as a single aperture. For example, higher frequency band (e.g., X-band) communications may utilize single-element apertures, mid-range frequency band (e.g., S-band) communications may utilize four-element apertures (e.g., 4×4 element squares), and lower-frequency band communications may utilize nine-element apertures (e.g., 3×3 element squares).

Figure 3:
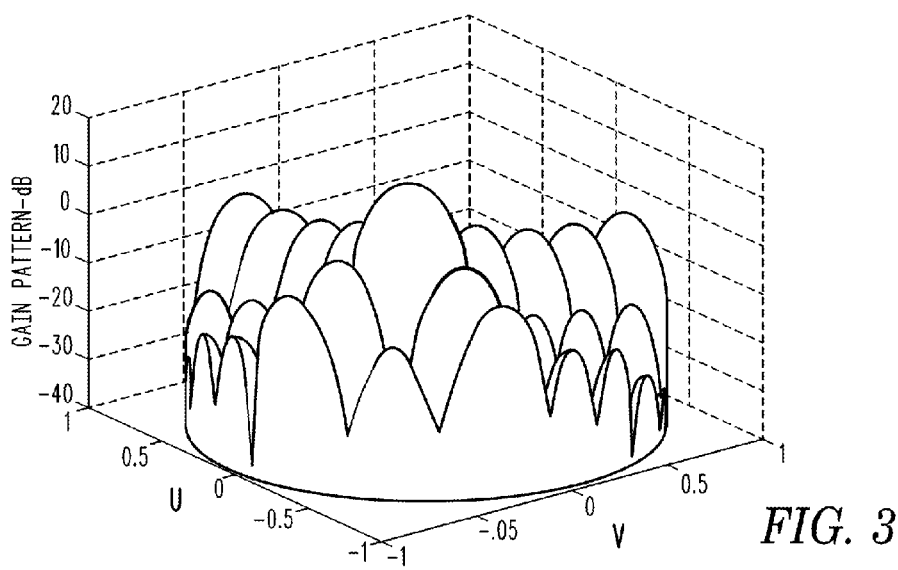
FIG. 3 is a directivity pattern of an AESA in accordance with some embodiments.

FIG. 3 is a directivity pattern of an AESA in accordance with some embodiment. As illustrated in FIG. 3, the control circuitry 110 (FIG. 1) may be configured to provide nearly a sin(x)/(x) amplitude pattern across the elements 214 (FIGS. 2A and 2B). In these example embodiments, the particular pattern may be determined by the configuration of the elements 214 (e.g., square or rectangular or other configuration) as well as the frequency, amplitude and phase of the signals. In some embodiments, the control circuitry 110 may be configured to communicate using different waveforms and switch between waveforms depending on the particular communication station 104. The example directivity pattern illustrated in FIG. 3 is for an 8×8 square array having a gain of 21 dB and 30 degrees of steering in the phi and theta axes.

In some embodiments, when the vehicle 102 (FIG. 1) is an interceptor, the communication station 104 may be a radar tracking station configured to track a moving target and provide target tracking data to the interceptor over a link established with the interceptor using the array. The interceptor may be configured to intercept the moving target using the target tracking data provided by a radar tracking station over the link. In some embodiments, the interceptor may switch between frequencies and apertures to switch between radar tracking stations. This may allow for over-the-horizon range extensions.

Figure 4:
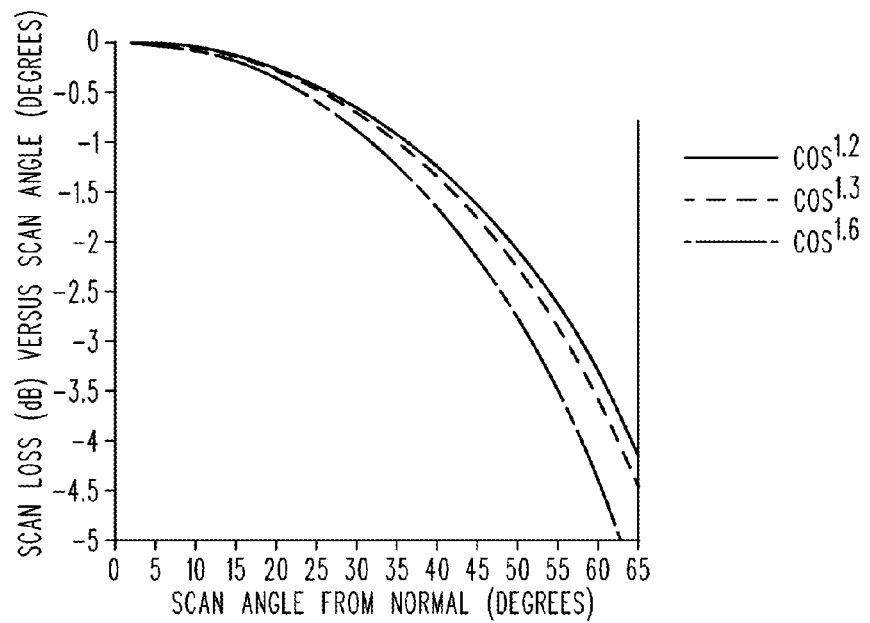
FIG. 4 shows scan loss as a function of scan angle of an AESA in accordance with some embodiments.

FIG. 4 shows scan loss as a function of scan angle of an AESA in accordance with some embodiments. Scan loss is the effect is due to coupled E-field interactions between elements as the bean angle deviates from normal. FIG. 4 shows this effect for selected scan loss functions. In FIG. 4, scan loss is shown as a function of scan angle for three representative cases. The scan loss may scale as $\cos^f(\text{alpha})$ where f is a factor such as 1.3, and alpha is scan angle. Since the beam is typically not steered beyond plus or minus 60 degrees excessive scan loss is avoided.

Figure 5:
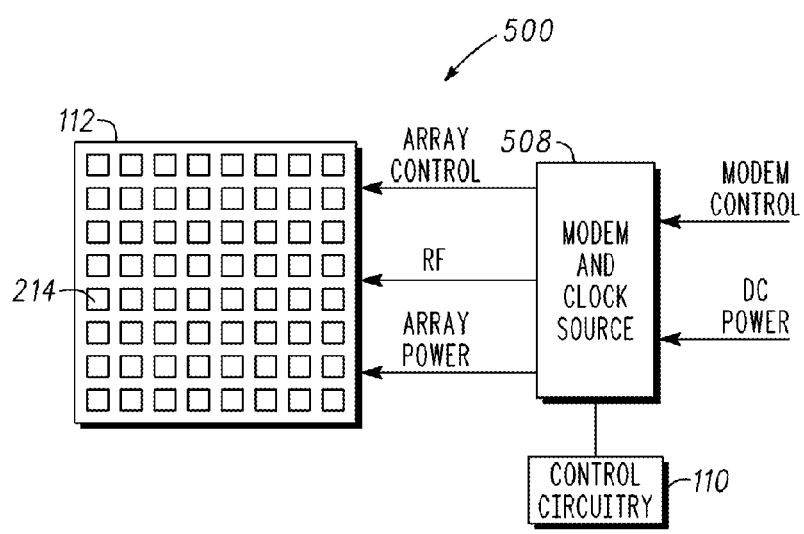
FIG. 5 illustrates a functional block diagram of a portion of an AESA system in accordance with some embodiments.

FIG. 5 illustrates a functional block diagram of a portion of an AESA system in accordance with some embodiments. FIG. 5 illustrates how an AESA may be combined with a modem to produce a data link. The AESA system 500 includes one or more arrays 112, control circuitry 110 and modem and clock source circuitry 508. The control circuitry 110 may configure the modem and clock source circuitry 508 and the array 112 to provide a data link. The modem and clock source circuitry 508 may provide array control signals and array power signals to the array 112 to perform the various operations described herein.

Figure 6:
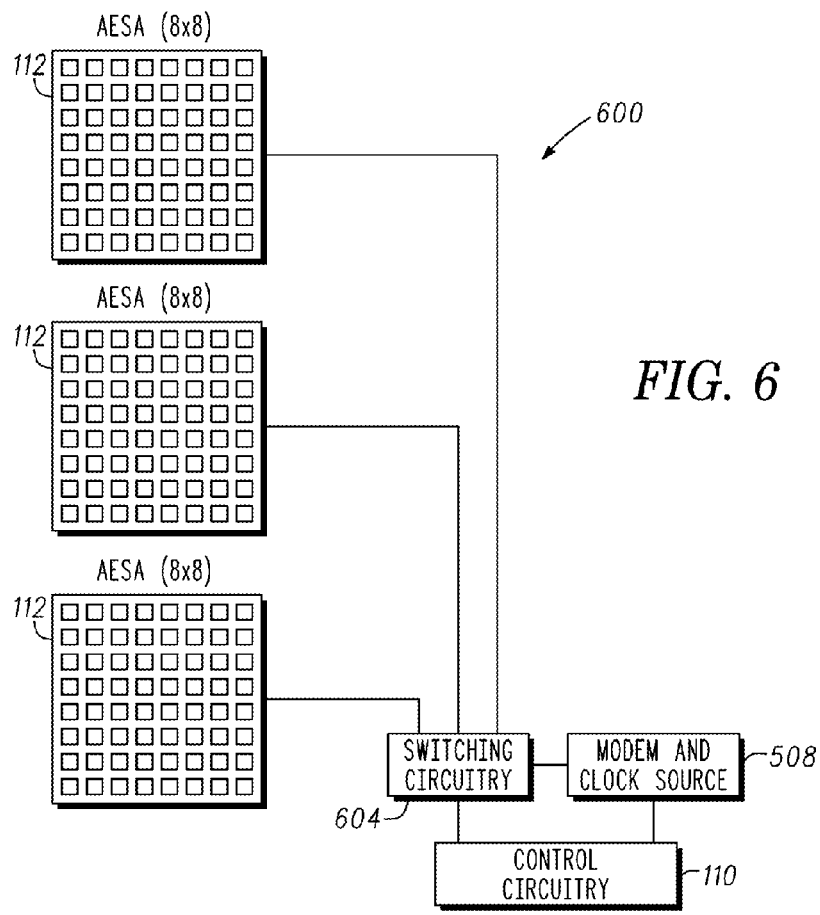
FIG. 6 illustrates a functional block diagram of an AESA data link system architecture in accordance with some other embodiments.

FIG. 6 illustrates a functional block diagram of an AESA in accordance with some other embodiments. In these embodiments, an AESA system 600 may include a plurality of arrays 112. The system includes switching circuitry 604 that is configured by the control circuitry 110 to switch between the arrays 112 of the plurality as the vehicle 102 (FIG. 1) spins and maneuvers to maintain communications with one or more communication stations. The switching circuitry 604 may comprise an RF switch.

The example architecture illustrated in FIG. 6 uses three arrays and a MODEM that can be mounted on a vehicle to obtain nearly omni-directional performance. More or fewer AESAs 112 may be used on a vehicle 102.

In some embodiments, each array 112 of the plurality may be positioned around the vehicle 102 at different angular-fields of regard. For example, when two arrays 112 are used, each array 112 may be provided at the 180 degree positions, when three arrays 112 are used, each array 112 may be provided at the 120 degree positions, and when four arrays 112 are used, each array 112 may be provided at the 90 degree positions. In some embodiments, each array 112 may be tilted forward or backward with respect to the front or the back of the vehicle 102 to achieve improved capability in either the forward or backward direction. In some embodiments, one array 112 may be provided between each divert thruster of an interceptor, although the scope of the embodiments is not limited in this respect.

Figure 7A:
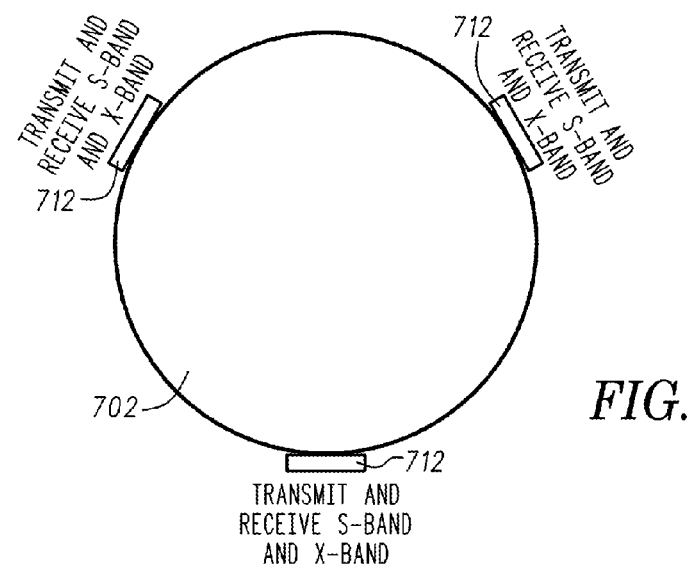
FIGS. 7A, 7B and 7C illustrate some various AESA vehicle placements and configurations in accordance with some other embodiments.
Figure 7B:
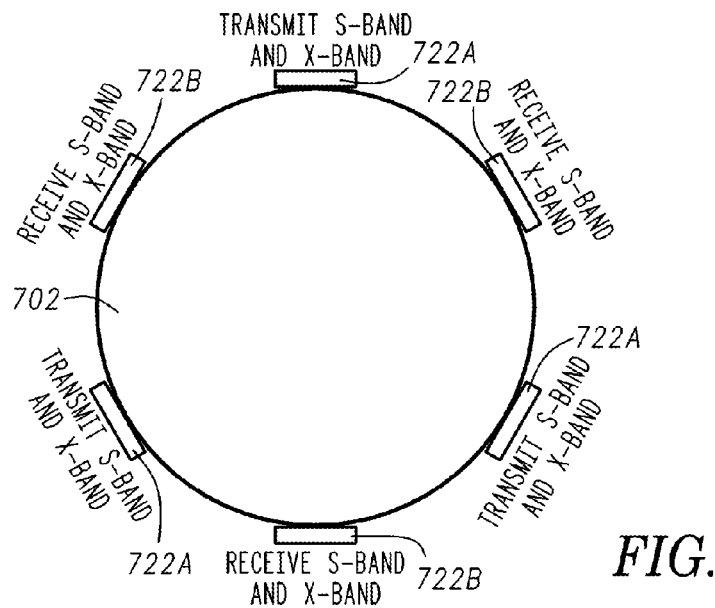
Figure 7C:
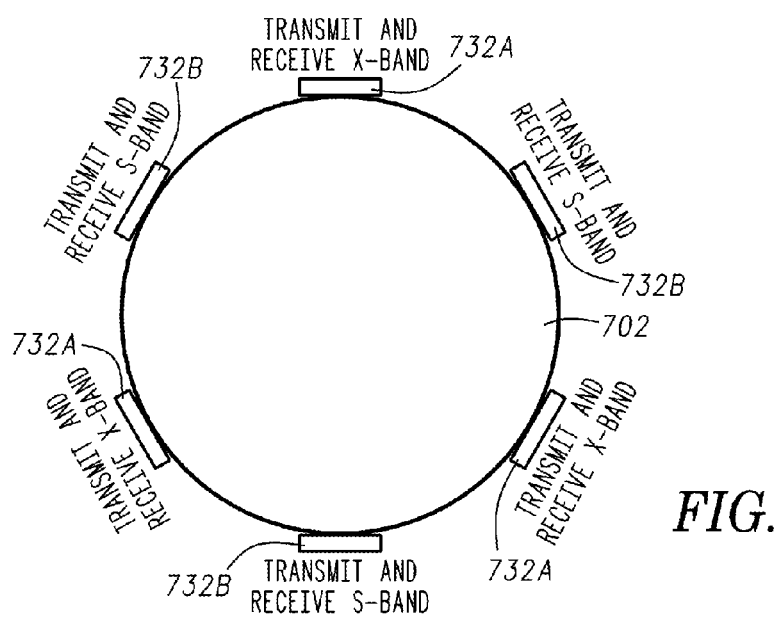

FIGS. 7A, 7B and 7C illustrate some various AESA configurations in accordance with some other embodiments. In these embodiments, AESAs are located circumferentially around a vehicle. In other embodiments, the arrays may be located in front of and/or in back of each other.

FIG. 7A illustrates the positioning of AESAs 712 at the approximately 120 degree positions on vehicle 702 in which each AESA is configured for both receiving and transmitting in more than one frequency band. Each AESA 712 may correspond to an array 112 (FIG. 1).

FIG. 7B illustrates the positioning of AESAs 722B configured for receiving at approximately 120 degree positions and the positioning of AESAs 722A configured for transmitting at approximately 120 degree positions on vehicle 702. Each AESA 722A and 722B may correspond to an array 112 (FIG. 1). In this example, the AESAs 722B may be separated from the AESAs 722A by approximately sixty-degrees. In this example, each AESA 722A and 722B may be is configured for communicating in more than one frequency band (e.g., X-band and S-band).

FIG. 7C illustrates the positioning of AESAs 732B configured for communicating in a first frequency band (e.g., S-band) at approximately 120 degree positions and the positioning of AESAs 732A configured for communicating in a second frequency band (e.g., X-band) at the other approximately 120 degree positions on the vehicle 702. Each AESA 732A and 73B may correspond to an array 112 (FIG. 1). In this example, the AESAs 732B may be separated from the AESAs 732A by approximately sixty-degrees. In this example, each AESA 732A and 732B may be configured for transmitting and receiving in a single frequency band (e.g., either X-band or S-band).

In some embodiments, an AESA 112 (FIG. 1) may be suitable for providing an AESA-Based Data Link for next generation interceptors (NGI). In these embodiments, high interceptor burnout velocities ($V_{bo}$) may be achieved and high kill vehicle (KV) divert velocities ($\Delta V$) may be supported. The high $V_{bo}$ and $\Delta V$ may be achieved by using low weight components. In these embodiments, the effectiveness (i.e., a high probability of kill) of a NGI may be increased with addition of a robust communications system on a maneuvering KV or missile. Embodiments disclosed herein provide a communications approach that supports the current CONOPS and architectures of legacy communications systems, and may readily enable, scale and interoperate with advancements in CONOPS and other architectures. In accordance with some embodiments, the AESA system may provide an evolved data link with a multiband frequency capability such as X or S band and/or others and can interoperate with different waveforms.

In accordance with embodiments, a communication system approach is disclosed herein that uses lightweight communications devices (AESA-based data links) that may meet the objectives of NGI (for example maneuvering, rolling vehicles) within the corresponding architecture advancements that retain interoperability with legacy systems.

The AESA-based Data links for KV or missile on NGI may meet the challenge of high $V_{bo}$ and $\Delta V$, and the challenge of expanding CONOPS and capabilities. This is evidenced by the fact that Active Electronically Steerable Array (AESA) antennas are suitable for radars and are having a similar beneficial impact on communications. AESAs also provide significant communications link performance over standard antennas such as, quasi-omni (switched) antennas, and other steerable approaches such as the Rotman lens or Butler-matrix antennas.

While a standalone capability is indicated in FIG. 1, other embodiments are applicable to a NGI operating in networked fashion where a handoff has occurred between the radars based on instructions from EC2BMC. An AESA-based data link achieves improved performance with the significantly low, weight, small volume, low DC power, and high EIRP. An AESA-based data link may be especially well suited to handle extreme vehicle dynamics while maintaining link margin such as with roll rates approaching several revolutions per second.

In accordance with embodiments, the AESA 112 may enjoy many advantages for use in military applications. These include lightweight, small volume, low DC power, solid-state reliability and manufacturability, modest production costs compared to discrete RF components, simple thermal management for small array sizes, allow for continuous communications, wideband high data rate operation, have a scalable physical level architecture, support HAENS environments in higher frequency bands (X-band and higher). In addition, steerable arrays provide nearly omni-directional performance despite a vehicle's attitude. High roll rates can be accommodated with simple algorithms.

A steerable narrow beam-width high-gain pattern from an AESA in accordance with embodiments has been simulated and its performance parameters calculated. For example a square array, such as the AESA of FIG. 2A, may exhibit 21 dB of gain may have the pattern shown in FIG. 3. Gain is defined as directivity plus losses. For these examples S and X band are discussed but since dual or multi-band AESA apertures are feasible the invention is not limited in this respect.

As discussed above, the directivity pattern illustrated in FIG. 3 is for an 8×8 square array having a gain of 21 dB and 30 degrees of steering in the phi and theta axes. In these embodiments, since $$G = \frac{4\pi A_e}{\lambda^2} \Rightarrow A_e = \frac{G\lambda^2}{4\pi}.$$

With $$\frac{\lambda}{2}$$

element spacing at mid X-band (10 GHz), and with N=8, the effective area Ae is $[(N-1)\lambda/2]^2 = 0.0110$. The directivity is thus 153.58=21.9 dB. With a 1 dB loss the gain is approximately 21 dB. In these embodiments, the array gain in dB is approximately be $10 \log(N^2)+3$ dB.

Note that S-band arrays will have fewer elements while being the same size as an X-band array since the free-space path loss goes as 20 log(f). Hence, S-band enjoys a 10 dB advantage in path loss over X-band that results in arrays that have approximately the same physical volume. An S-band AESA may enjoy some advantages in element power density so that there is no significant penalty between S-band and X-band regarding the array size. For dual aperture arrays a trade may be accomplished that favors either the S or X band efficiencies depending on the need.

In accordance with embodiments, the antenna beamwidth may be nearly inversely proportional to the array dimensions and proportional to the wavelength. For a 64 element square array with d=0.14 meters at 10 GHz the beamwidth will be θ=λ/d=0.03/0.14=0.214 radians=12 degrees. At 3 GHz the same array with 16 elements yields a beamwidth of 40.9 degrees. These are approximations only which may vary from actual beamwidth measurements. Although this example describes a dual aperture, embodiments also include multi-aperture AESAs with wide bandwidth characteristics.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the AESA system may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An adaptive electronically steerable array (AESA) system suitable for use on a vehicle, the system comprising:
a plurality of arrays, each comprising a plurality of radiating elements; and
control circuitry coupled to the plurality of arrays to configure the arrays for switchable multi-band and multi-aperture operations, wherein the control circuitry is configured
to use a line-of-sight (LOS) vector to direct the array for communications with a communication station as the vehicle maneuvers,
to use the LOS vector to reconfigure the arrays to switch between communicating with a first communication station and a second communication station, and
to switch between communicating with a first communication station within a first frequency band through a first aperture, the first frequency band established for communication with the first communication station, and communicating with the second communication station within a second frequency band through a second aperture, the second frequency band established for communication with the second communication station, the first and second frequency bands being widely-spaced frequency bands having at least a five percent carrier frequency separation,
wherein the first frequency band is a higher-frequency band than the second frequency band, and
wherein for the multi-band and the multi-aperture operations, the control circuitry:
configures each element to operate as a single aperture to transmit RF signals for communicating with the first communication station within the first frequency band, and
configures a plurality of two or more elements to operate as a single element, single aperture, to transmit coherently combined RF signals that have the same phase shift, for communicating with the second communication station within the second frequency band.

2. The AESA system of claim 1 wherein the control circuitry configures a perfect-square number of elements to operate as a single aperture for communicating within the second frequency band.

3. The AESA system of claim 1 wherein the first frequency band is X-band and the second frequency band is S-band,
wherein for communicating at an X-band frequency, each element of an array is configured to operate as a single aperture, and
wherein for communicating at an S-band frequency, squares of four elements of an array are configured to operate as a single aperture.

4. The AESA system of claim 3 wherein the control circuitry is configured to provide a sin(x)/(x) amplitude pattern across the elements of an array when operating in the first frequency band and when operating in the second frequency band.

5. The AESA system of claim 3 wherein the vehicle is an interceptor comprising one of a kill-vehicle or missile, wherein the communication station is one of a ground based, a ship-based, an aircraft-based or a satellite based communication station, wherein the communication station includes a radar tracking station configured to track a moving target and provide target-tracking data to the interceptor over a link established with the interceptor using the array, and wherein the interceptor is configured to intercept the moving target using the target tracking data provided by a radar tracking station.

6. The AESA system of claim 5 wherein the arrays are located circumferentially around a vehicle, and wherein the system further comprising switching circuitry that is configured by the control circuitry to switch between the arrays of the plurality as the vehicle spins to maintain communications with the communication station.

7. An interceptor comprising:

an adaptive electronically steerable array (AESA) system comprising a plurality of arrays, each array comprising a plurality of radiating elements, and control circuitry coupled to the plurality of arrays to configure each of the arrays for switchable multi-band and multi-aperture operations, wherein the control circuitry is configured to:

use a line-of-sight (LOS) vector to direct the arrays to maintain communications with communication stations as the interceptor maneuvers;

switch between communicating with a first communication station within a first frequency band through a first single aperture, the first frequency band established for communication with the first communication station, and communicating with a second communication station within a second frequency band through a second single aperture, the second frequency band established for communication with the second communication station;

configure single elements of the arrays to operate as the first single aperture to transmit RF signals for communicating with the first communication station within the first frequency band; and configuring two or more elements of the arrays to operate as the second single element, single aperture, to transmit coherently combined RF signals that have the same phase shift, for communicating with the second communication station within the second frequency band.

8. The interceptor of claim 7 wherein the control circuitry configures a perfect-square number of elements to operate as the second single aperture for communicating within the second frequency band.

9. The interceptor of claim 8 wherein the second communication station is over-the-horizon with respect to the first communication station, and wherein the control circuitry is to switch between communicating with the first communication station within the first frequency band through the first single aperture to communicating with the second communication station within the second frequency band through the second single aperture during a flight path of the interceptor.

10. The interceptor of claim 9 wherein the arrays are located circumferentially around a vehicle, and wherein the system further comprising switching circuitry that is configured by the control circuitry to switch between the arrays of the plurality as the vehicle spins to maintain communications with the communication station.

11. The interceptor of claim 10 wherein the interceptor comprises one of a kill-vehicle or missile.

12. A method performed by an adaptive electronically steerable array (AESA) system for maintaining a data link between a vehicle and one or more communication stations, the method comprising:

using a line-of-sight (LOS) vector to direct an array of the AESA system to maintain communications with a communication station as the vehicle maneuvers; and switching between communicating with a first communication station within a first frequency band through a first single aperture, the first frequency band established for communication with the first communication station, and communicating with a second communication station within a second frequency band through a second single aperture, the second frequency band established for communication with the second communication station, wherein the first and second frequency bands are widely-spaced frequency bands, wherein the AESA system includes one or more AESAs comprising a plurality of radiating elements that are configured for multi-band and multi-aperture operations, wherein the first frequency band is a higher-frequency band than the second frequency band, and wherein for the multi-band and the multi-aperture operations, the method includes:

configuring single elements of the arrays to operate as the first single aperture to transmit RF signals for communicating with the first communication station within the first frequency band, and configuring groups of two or more elements of the arrays to operate as the second single element, single aperture, to transmit coherently combined RF signals that have the same phase shift, for communicating with the second communication station within the second frequency band.

13. The method of claim 12 wherein the arrays are located circumferentially around the vehicle, and wherein the method further comprises switching between the arrays of the plurality as the vehicle spins to maintain communications with the communication station.

* * * * *